(12) United States Patent
Oh et al.

(10) Patent No.: US 12,380,002 B2
(45) Date of Patent: Aug. 5, 2025

(54) STORAGE DEVICE AND RECOVERY DATA BACKUP METHOD THEREOF

(71) Applicant: Samsung Electronics Co., Ltd., Suwon-si (KR)

(72) Inventors: Jaerim Oh, Suwon-si (KR); Jeong-Eun Kim, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 2 days.

(21) Appl. No.: 18/333,190

(22) Filed: Jun. 12, 2023

(65) Prior Publication Data

US 2024/0202081 A1    Jun. 20, 2024

(30) Foreign Application Priority Data

Dec. 20, 2022   (KR) .................. 10-2022-0178933

(51) Int. Cl.
  *G06F 11/14*   (2006.01)
  *G06F 11/07*   (2006.01)

(52) U.S. Cl.
  CPC ...... *G06F 11/1469* (2013.01); *G06F 11/0793* (2013.01)

(58) Field of Classification Search
  CPC .................. G06F 11/1469; G06F 11/0793
  USPC .................................................. 711/162
  See application file for complete search history.

(56) References Cited

U.S. PATENT DOCUMENTS

| | | |
|---|---|---|
| 7,761,681 B2 | 7/2010 | Jewell et al. |
| 8,275,930 B2 | 9/2012 | Inoue et al. |
| 9,009,417 B2 | 4/2015 | Okawa |
| 9,141,505 B1 | 9/2015 | Crow et al. |
| 9,690,664 B2 | 6/2017 | Ide et al. |
| 10,521,305 B2 * | 12/2019 | Delaney .............. G06F 11/3034 |
| 10,613,782 B2 | 4/2020 | Kim et al. |
| 10,789,130 B1 | 9/2020 | Horspool et al. |
| 2015/0363272 A1 * | 12/2015 | Zheng ................. G06F 11/1471 714/19 |

(Continued)

FOREIGN PATENT DOCUMENTS

| | | |
|---|---|---|
| JP | 2013-061791 A | 4/2013 |
| KR | 10-2277728 B1 | 7/2021 |

OTHER PUBLICATIONS

Extended European Search Report issued Mar. 22, 2024 in European Application No. 23200200.6.

*Primary Examiner* — Gautam Sain
(74) *Attorney, Agent, or Firm* — Harness, Dickey & Pierce, P.L.C.

(57) ABSTRACT

Disclosed is a storage device comprises a non-volatile memory configured to store data; a storage controller configured to determine a time to back up recovery data when a sudden power-off occurs and to perform a data dump operation according to a dump level determined based on the determined time when a user data dump fails; and a power loss protection (PLP) integrated circuit configured to measure at least one of a discharge time or remaining time of an auxiliary power supply when the sudden power-off occurs and to provide at least one of discharge time information or remaining time information to the storage controller, wherein the storage controller is configured to determine a minimum recovery data backup time in case of a user data dump failure using the at least one of the discharge time information or the remaining time information.

20 Claims, 10 Drawing Sheets

(56) References Cited

U.S. PATENT DOCUMENTS

| | | | |
|---|---|---|---|
| 2018/0032390 A1* | 2/2018 | Rahmanian | G06F 11/0754 |
| 2021/0181941 A1* | 6/2021 | Bernat | G06F 12/0246 |
| 2022/0011945 A1* | 1/2022 | Coleman | G06F 3/067 |
| 2022/0083470 A1 | 3/2022 | Jeon et al. | |
| 2022/0171542 A1 | 6/2022 | Kim et al. | |

* cited by examiner

FIG.6

| | $T_{min} \geq T_{est} - (T_{elapsed} + T_{misc})$ |
|---|---|
| Tmin | Minimum time which shall be guaranteed for recovery data dump |
| Test | Estimated time by using real-time capacitor discharge timer and its time-energy conversion logic |
| Telapsed | Elapsed time from the power loss recognition |
| Tmisc | Miscellaneous time includes abort time and energy consumption in idle, etc |

STORAGE DEVICE AND RECOVERY DATA BACKUP METHOD THEREOF

CROSS-REFERENCE TO RELATED APPLICATIONS

This application claims priority under 35 U.S.C. § 119 to Korean Patent Application No. 10-2022-0178933 filed on Dec. 20, 2022, in the Korean Intellectual Property Office, the disclosures of which are incorporated by reference herein in their entireties.

BACKGROUND

Embodiments of the present disclosure described herein relate to a storage system, and more particularly, to a storage device and a recovery data backup method thereof.

A storage device including nonvolatile memories and a storage controller operates by receiving power from a host. A sudden power-off situation in which power is suddenly cut off while the storage device is operating may occur. Since the storage controller uses volatile memories to store data, data stored in volatile memories may be lost. An operation (e.g., erase operation, write operation, etc.) being performed in the non-volatile memories may not be completed. The storage device uses an auxiliary power supply to complete the operation being performed and back up data.

SUMMARY

Embodiments of the present disclosure provide a storage device that estimates a recovery data backup time in consideration of remaining time and/or energy and performs a data dump operation according to a predetermined dump level during an operation for a power loss process failure.

Embodiments of the present disclosure provide a method for backing up recovery data of a storage device predefining a dump level according to a remaining time after a failure determination and dumping minimum recovery data to a non-volatile memory according to the dump level.

According to an embodiment, a storage device comprises a non-volatile memory configured to store data; a storage controller configured to determine a time to back up recovery data when a sudden power-off occurs and to perform a data dump operation according to a dump level determined based on the determined time when a user data dump fails; and a power loss protection (PLP) integrated circuit configured to measure at least one of a discharge time or remaining time of an auxiliary power supply when the sudden power-off occurs and to provide at least one of discharge time information or remaining time information to the storage controller, wherein the storage controller is configured to determine a minimum recovery data backup time in case of a user data dump failure using the at least one of the discharge time information or the remaining time information.

According to an embodiment, a method for backing up recovery data of a storage device comprises determining at least one of a discharge time or a remaining time of an auxiliary power supply when a sudden power-off occurs; determining a minimum recovery data backup time, in case of a user data dump failure, using the determined at least one of the discharge time or the remaining time; and performing a data dump operation according to a predefined dump level during the determined recovery data backup time.

According to an embodiment, a storage system comprises a storage device including non-volatile memory and processing circuitry; and a host connected to the storage device through a host interface, wherein the storage device is configured to determine at least one of a discharge time or a remaining time of an auxiliary power supply when sudden power-off occurs, determine a minimum recovery data backup time, in case of a user data dump failure, using the determined at least one of the discharge time or the remaining time, and perform a data dump operation according to a defined dump level during the determined recovery data backup time.

BRIEF DESCRIPTION OF THE FIGURES

The above and other objects and features of the present disclosure will become apparent by describing in detail embodiments thereof with reference to the accompanying drawings.

FIG. 6 is a formula and diagram for explaining an operating method illustrated in FIG. 5.

DETAILED DESCRIPTION

Figure 1:
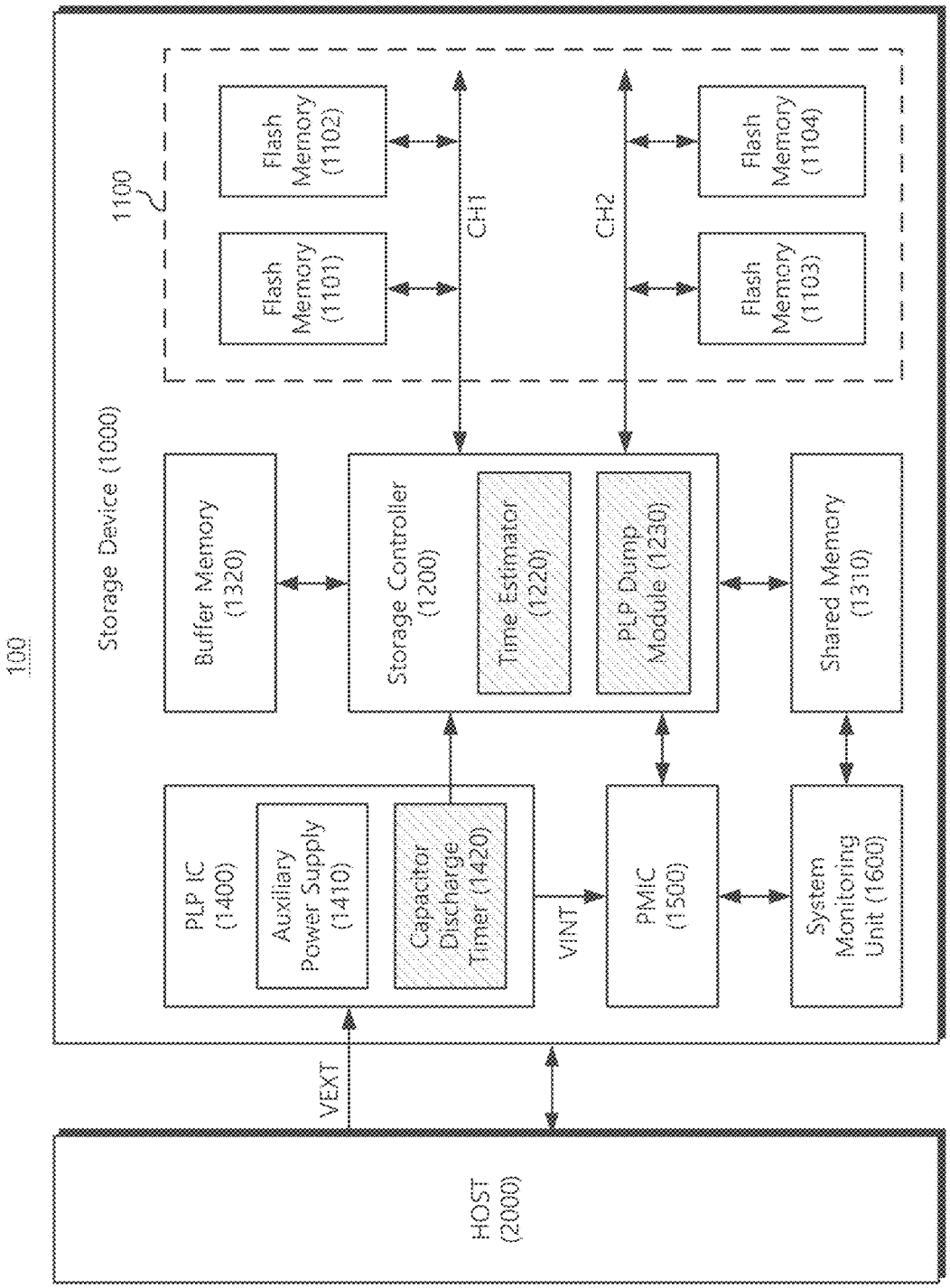
FIG. 1 is a block diagram illustrating a storage system according to example embodiments of the present disclosure.

Below, embodiments of the present disclosure will be described in detail and clearly to such an extent that an ordinary one in the art easily implements the invention. The same reference numerals are used for the same components in the drawings, and redundant descriptions thereof will be omitted.

It will also be understood that spatially relative terms, such as "above", "top", etc., are intended to encompass different orientations of the device in use or operation in addition to the orientation depicted in the figures, and that the device may be otherwise oriented (rotated 90 degrees or at other orientations) and the spatially relative terms used herein interpreted accordingly.

Also, functional terms such as those including "unit", " . . . er/or", "module", "logic", etc., described in the specification mean units that process at least one function or operation, and may be implemented as processing circuitry such as hardware, software, or a combination of hardware and software, unless expressly indicated otherwise. For example, the processing circuitry more specifically may include, but is not limited to, electrical components such as at least one of transistors, resistors, capacitors, etc., or electronic circuits including said components, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

FIG. 1 is a block diagram illustrating a storage system according to example embodiments of the present disclosure. Referring to FIG. 1, a storage system 100 includes a storage device 1000 and a host 2000. The storage device 1000 and the host 2000 may be connected through a host interface. For the host interface, standard interfaces such as advanced technology attachment (ATA), serial ATA (SATA), parallel ATA (PATA), universal serial buses (USB), small computer system interface (SCSI), enhanced small disk interface (ESDI), institute of electrical and electronics engineering (IEEE) 1394, integrated drive electronics (IDE), card interfaces, and/or the like may be used.

The storage device 1000 may be based on the nonvolatile memory 1100. As shown in FIG. 1, the nonvolatile memory 1100 may include, for example, a plurality of flash memories. The plurality of flash memories may be grouped. For example, in at least one embodiment a first group, including at least the first and second flash memories 1101 and 1102, may be connected to the storage controller 1200 through a first channel CH1 and a second group, including at least the third and fourth flash memories 1103 and 1104, may be connected to the storage controller 1200 through a second channel CH2. In at least one embodiment, the storage device 1000 is a solid-state drive (SSD), wherein the nonvolatile memory 1100 is the solid-state storage.

The storage controller 1200 may control the operation of the nonvolatile memory 1100 (e.g., according to firmware for driving the storage device 1000). The storage controller 1200 may be simultaneously connected to one or more flash memories 1101 to 1104 through the first and second channels CH1 and CH2, however the examples are not limited thereto. For example, the number of channels connected to the storage controller 1200 may be greater than two. Also, the number of flash memories connected to one channel may be more than two.

A shared memory 1310 and a buffer memory 1320 may be connected to the storage controller 1200. The shared memory 1310 and/or the buffer memory 1320 may store commands and/or data executed or processed by the storage controller 1200. The shared memory 1310 and/or the buffer memory 1320 may temporarily store data stored or to be stored in the nonvolatile memory 1100. For example, volatile memories such as dynamic random access memory (DRAM), static RAM (SRAM), and/or the like may be used as the shared memory 1310 and/or the buffer memory 1320.

The storage controller 1200 may be connected to the shared memory 1310 through a shared interface and connected to the buffer memory 1320 through a buffer interface. The storage controller 1200 may provide data temporarily stored in the buffer memory 1320 to the flash memory through respective channels CH1 and CH2. The storage controller 1200 may transfer data read from the flash memories 1101 to 1104 to the buffer memory 1320.

The storage controller 1200 may manage data to be stored in the flash memories 1101 to 1104. When sudden power-off occurs, the storage controller 1200 may back up data stored in the buffer memory 1320 (e.g., user data and/or recovery data) to the flash memories 1101 to 1104 through a dump operation.

The storage controller 1200 may estimate a time required to back up user data and/or recovery data and control a data dump operation when sudden power-off occurs. The storage controller 1200 may include a time estimator 1220 and a power loss protection (PLP) dump module 1230. The time estimator 1220 may perform a time estimation operation to estimate a time required to back up recovery data in case of sudden power-off. The PLP module 1230 may perform (or control) a dump operation for backing up recovery data according to a predefined dump level.

The storage device 1000 may further comprise a power loss protection (PLP) integrated circuit (IC) 1400, a power management integrated circuit (PMIC) 1500, and a system monitoring unit 1600. The PLP IC 1400 may generate an internal power voltage VINT based on the external power voltage VEXT. In at least one embodiment, the PLP IC 1400 may include an auxiliary power supply 1410 and a power monitoring circuit 1420.

The auxiliary power supply 1410 may use capacitors as a charging element. When the storage device 1000 is suddenly powered off, the auxiliary power supply 1410 may output the charging voltage stored in the charging device as the internal power supply voltage VINT. The auxiliary power supply 1410 may charge (or maintain the charge of) the charging elements while the storage device 1000 is powered on. In at least one embodiment, different from the illustration, the auxiliary power supply 1410 may be located outside the power loss protection integrated circuit 1400.

The power monitoring circuit 1420 may monitor the voltage level of the charging device of the auxiliary power supply 1410. The power monitoring circuit 1420 may measure a discharge time and/or a remaining time of capacitors when sudden power-off occurs. In these cases, the power monitoring circuit 1420 may also be referred to a capacitor discharge timer. The power monitoring circuit 1420 may provide discharge time and/or remaining time information to the storage controller 1200.

The power management integrated circuit 1500 may receive the internal power voltage VINT from the power loss protection integrated circuit 1400 and perform a power management operation of the storage device 1000. The power management integrated circuit 1500 may directly receive an external power voltage VEXT from the outside and perform a power management operation. The power management integrated circuit 1500 may generate and manage driving voltages of various levels supplied to the storage controller 1200, the nonvolatile memory 1100, the shared memory 1310, and/or the buffer memory 1320 using either an external power supply voltage VEXT and/or an internal power supply voltage VINT.

For example, the power management integrated circuit 1500 may be configured to generate the driving voltage VDD based on the external power voltage VEXT before the external power voltage VEXT is turned off; and to generate the driving voltage VDD based on the internal power voltage VINT after the external power voltage VEXT is turned off. The power management integrated circuit 1500 may supply the driving voltage VDD for a desired and/or alternatively predetermined time even after the power of the storage device 1000 is turned off.

The system monitoring unit 1600 may minimize firmware overhead by monitoring the hardware of the storage system 100.

The host 2000 may control overall operations of the storage system 100. For example, although not illustrated in detail, the host 2000 may include a host processor and a host memory. The host processor may control the operation of the host 2000 and execute, for example, an Operating System (OS). The host memory may store instructions and data executed and processed by the host processor. For example, an operating system executed by the host processor may include a file system for file management and a device driver for controlling peripheral devices including the storage device 1000 at the operating system level.

Figure 2:
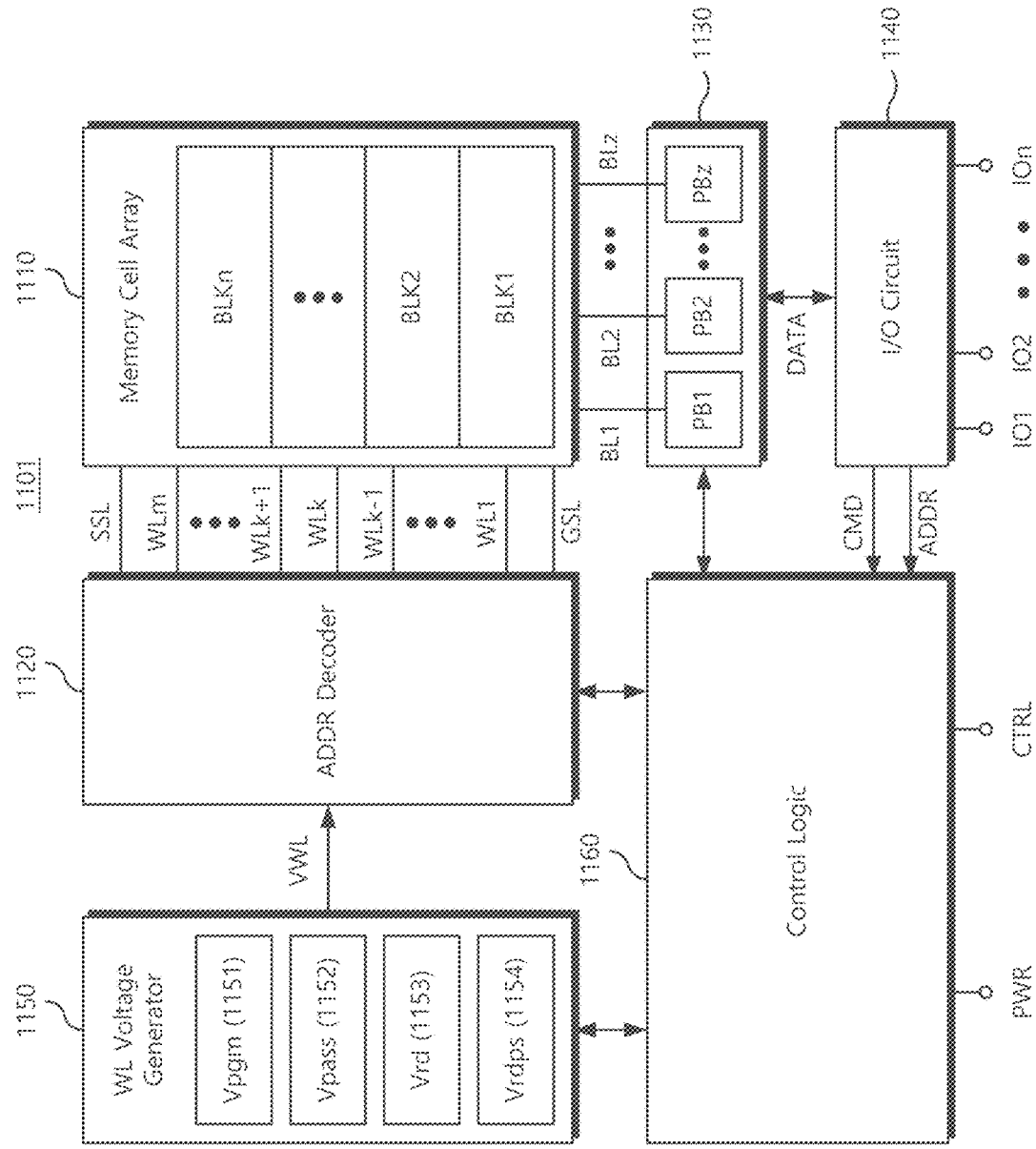
FIG. 2 is a block diagram illustrating at least one example embodiment of the flash memory illustrated in FIG. 1.

FIG. 2 is a block diagram illustrating at least one example embodiment of the flash memory illustrated in FIG. 1. Referring to FIG. 2, a flash memory 1110 includes a memory cell array 1110, an address decoder 1120, a page buffer circuit 1130, a data input/output circuit 1140, a word line voltage generator 1150, and a control logic 1160.

The memory cell array 1110 may include a plurality of memory blocks BLK1 to BLKn. Each memory block may be composed of a plurality of pages. Each page may include a plurality of memory cells. Multi-bit data may be stored in each memory cell. Each memory block is an erase unit, and each page may be a read or write unit.

The memory cell array 1110 may be formed in a direction perpendicular to the substrate. A gate electrode layer and an insulation layer may be alternately deposited on the substrate. Each memory block (e.g., BLK1) may be connected to a string selection line SSL, a plurality of word lines WL1 to WLm, and a ground selection line GSL. Here, WLk is the selected word line sWL and the remaining word lines (WL1 to WLk−1, WLk+1 to WLm) are the unselected word lines uWL.

The address decoder 1120 may be connected to the memory cell array 1110 through selection lines SSL and GSL and word lines WL1 to WLm. The address decoder 1120 may select a word line during a program or read operation. The address decoder 1120 may receive the word line voltage VWL from the word line voltage generator 1150 and provide a program voltage or read voltage to the selected word line.

The page buffer circuit 1130 may be connected to the memory cell array 1110 through bit lines BL1 to BLz. The page buffer circuit 1130 may temporarily store data to be stored in the memory cell array 1110 and/or data read from the memory cell array 1110. The page buffer circuit 1130 may include page buffers PB1 to PBz connected to respective bit lines. Each page buffer may include a plurality of latches to store or read multi-bit data.

The input/output ("I/O") circuit 1140 may be internally connected to the page buffer circuit 1130 through data lines and externally connected to a memory controller (refer to FIG. 1, 1200) through the input/output lines IO1 to IOn. The input/output circuit 1140 may receive program data from the memory controller 1200 during a program operation. Also, the input/output circuit 1140 may provide data read from the memory cell array 1110 to the memory controller 1200 during a read operation.

The word line voltage generator 1150 may receive internal power from the control logic 1160 and generate a word line voltage VWL used to read or write data. The word line voltage VWL may be provided to a selected word line sWL or an unselected word line uWL through the address decoder 1120.

The word line voltage generator 1150 may include a program voltage generator 1151 and a pass voltage generator 1152. The program voltage generator 1151 may generate a program voltage Vpgm provided to the selected word line sWL during a program operation. The pass voltage generator 1152 may generate a pass voltage Vpass provided to the selected word line sWL and the unselected word lines uWL.

The word line voltage generator 1150 may include a read voltage generator 1153 and a read pass voltage generator 1154. The read voltage generator 1153 may generate the select read voltage Vrd provided to the select word line sWL during a read operation. The read pass voltage generator 1154 may generate a read pass voltage Vrdps provided to the unselected word lines uWL. The read pass voltage Vrdps may be a voltage sufficient to turn on memory cells connected to the unselected word lines uWL during a read operation.

The control logic 1160 may perform read, program, and erase operations of the flash memory 1100 using the command CMD, address ADDR, and control signal CTRL provided from the memory controller 1200. The address ADDR may include a block selection address for selecting one memory block. Also, the address ADDR may include a row address for selecting one or more word lines and a column address for selecting one or more bit lines.

Figure 3:
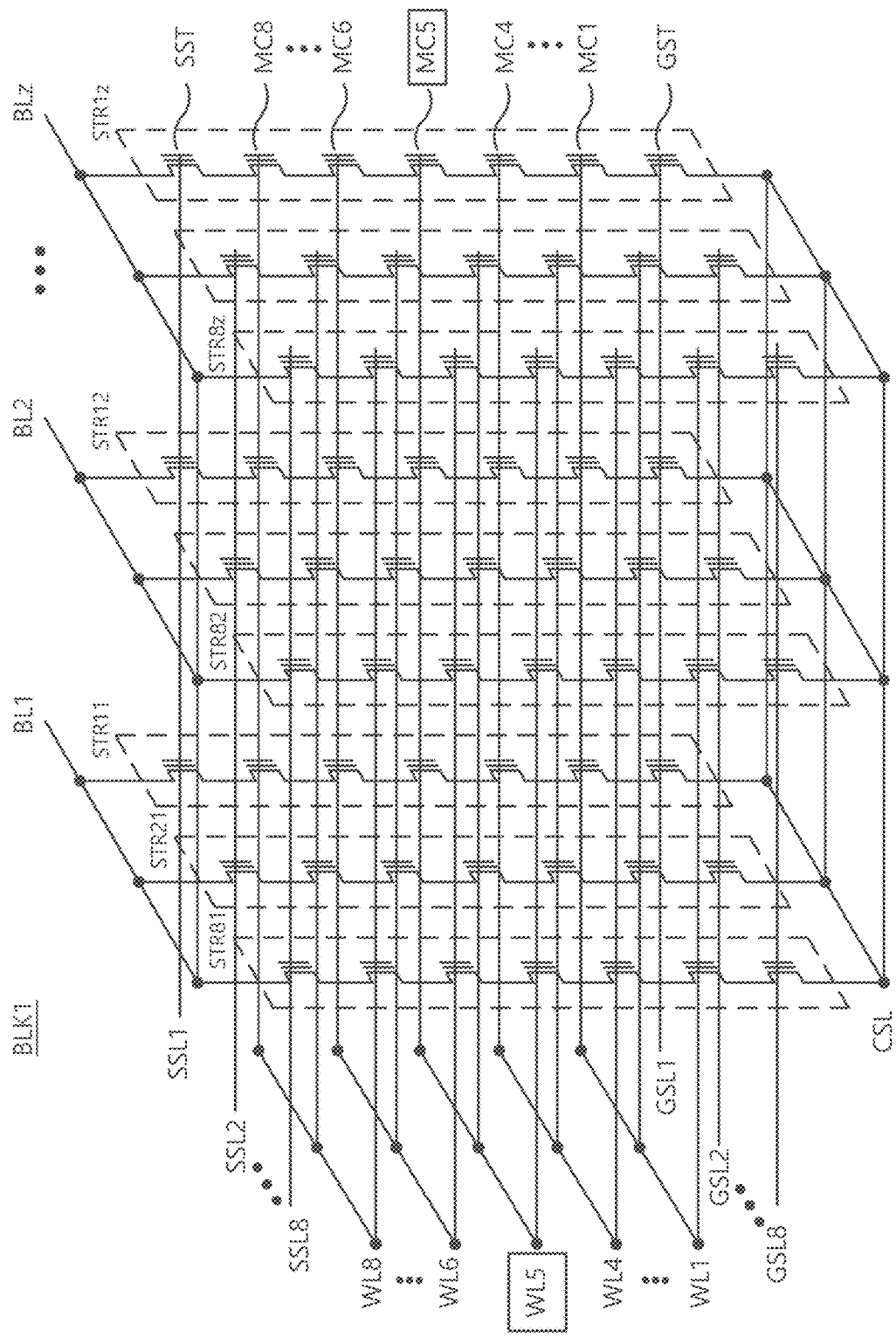
FIG. 3 is a circuit diagram illustrating at least one example embodiment of a memory block BLK1 of the memory cell array illustrated in FIG. 2.

FIG. 3 is a circuit diagram illustrating at least one example embodiment of a memory block BLK1 of the memory cell array illustrated in FIG. 2. Referring to FIG. 3, in the memory block BLK1, a plurality of cell strings STR11 to STR8z may be formed between the bit lines BL1 to BLz and a common source line CSL. Each cell string includes a string selection transistor SST, a plurality of memory cells MC1 to MC8, and a ground selection transistor GST.

The string selection transistors SST may be connected with string selection lines SSL1 to SSL8. The ground selection transistors GST may be connected with ground selection lines GSL1 to GSL8. The string selection transistors SST may be connected with the bit lines BL1 to BLz, and the ground selection transistors GST may be connected with the common source line CSL. Though the figure illustrates an example including eight string selection lines SSL1 to SSL8, eight ground selection lines GSL1 to GSL8, 3 bit lines BL1 to BLZ, and 8 memory cells MC1 to MC8, the examples are not limited to the illustrated example; for example, the memory block BLK1 may include more or fewer of the string selection lines SSL, the ground selection lines GSL, bit lines BL, and/or memory cells MC.

The plurality of word lines WL1 to WL8 may be connected with the plurality of memory cells MC1 to MC8 in a row direction. The plurality of bit lines BL1 to BLz may be connected with the plurality of memory cells MC1 to MC8 in a column direction. A plurality of page buffers (refer to FIG. 2, PB1 to PBz) may be connected with the plurality of bit lines BL1 to BLZ.

The first word line WL1 may be placed above the first to eighth ground selection lines GSL1 to GSL8. The first memory cells MC1 that are placed at the same height from the substrate may be connected with the first word line WL1. Likewise, the second to eighth memory cells MC2 to MC8 that are placed at the same heights from the substrate may be respectively connected with the second to eighth word lines WL2 to WL8.

Figure 4:
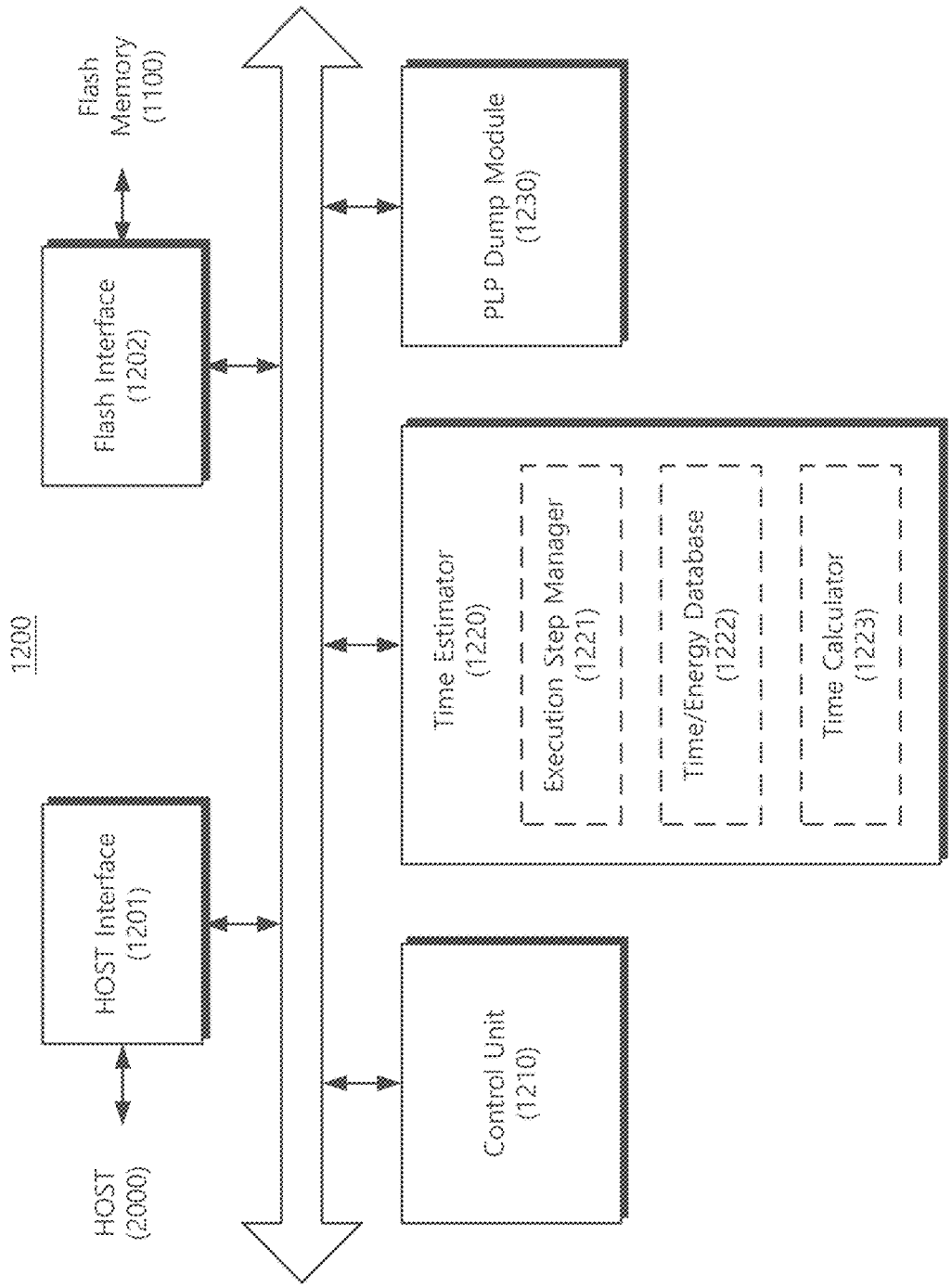
FIG. 4 is a block diagram illustrating at least one example embodiment of the storage controller illustrated in FIG. 1.

FIG. 4 is a block diagram illustrating at least one example embodiment of the storage controller illustrated in FIG. 1. Referring to FIG. 4, the storage controller 1200 may include a control unit 1210, a time estimator 1220, and a PLP dump module 1230, and may include (or be connected to) a host interface 1201 and a flash interface 1202.

Although not illustrated in FIG. 4, the storage controller 1200 may further comprise various other elements. For example, the storage controller 1200 may include a random access memory (RAM) for temporarily storing data according to a read or write operation of the flash memory 1100. The storage controller 1200 may further comprise a RAM control module for controlling the RAM and/or a command generation module for generating commands (refer to FIG. 2, CMD) for controlling memory operations according to a request of the host 2000.

The host interface 1201 provides an interface between the host 2000 and the storage controller 1200. For a standard interface, various interface schemes such as advanced technology attachment (ATA), serial ATA (SATA), external SATA (e-SATA), small computer small interface (SCSI), serial attached SCSI (SAS), peripheral component interconnection (PCI), PCI-E (PCI express), IEEE 1394, USB (universal serial bus), SD (secure digital) card, MMC (multi-media card), eMMC (embedded multimedia card), universal flash storage (UFS), CF (compact flash) may be used.

The flash interface 1202 may provide an interface between the flash memory 1100 and the storage controller 1200. For example, write or read data may be transmitted and received to and from the flash memory 1100 through the flash interface 1202. The flash interface 1202 may provide commands and addresses to flash memory 1100. Also, the flash interface 1202 may provide data read from the flash memory 1100 to the storage controller 1200.

The control unit 1210 may include processing circuitry (such as central processing units and/or microprocessors) and control overall operations of the storage controller 1200. The control unit 1210 may drive firmware loaded in the time estimator 1220 and/or the PLP dump module 1230 to control the storage controller 1200. The time estimator 1220 and/or the PLP dump module 1230 may be implemented with (and/or include) various types of memories, such as cache memory, DRAM, SRAM, phase-change RAM (PRAM), and/or the like.

The control unit 1210 may drive a flash translation layer (FTL). The flash translation layer may be loaded from the flash memory 1100 during a booting operation of the storage device 1000. The flash translation layer may perform an address mapping operation, a garbage collection operation, a wear-leveling operation, a bad block management operation, and/or a meta data management operation according to functions implemented by firmware.

The time estimator 1220 may include an execution step manager 1221, a time/energy database 1222, and a time calculator 1223. The execution step manager 1221, the time/energy database 1222, and the time calculator 1223 may be implemented in processing circuitry.

The execution step manager 1221 is a module for determining the execution step. The execution step manager 1221 may manage whether there is sufficient time to perform the remaining operations after a failure determination. In addition, the execution step manager 1221 may manage whether an operation may be performed up to a specific step (e.g., I/O flush). The time/energy database 1222 may estimate remaining time using the time and/or energy database. The time calculator 1223 may calculate how much remaining time is left.

For example, time estimator 1220 may calculate unit time based on a minimum guaranteed operation time and/or a reference dump amount. The time estimator 1220 may calculate and determine the minimum required time by calculating the time for the specified dump amount. The time estimator 1220 may also estimate the dump guaranteed time according to lifetime or environment by checking the remaining energy in real time.

The PLP dump module 1230 performs a PLP dump operation of moving data stored in the buffer memory 1320 to the nonvolatile memory 1100. Data dumped by the PLP dump module 1230 may be minimum essential recovery data (e.g., minimum debug data, etc.).

The storage device 1000 may include capacitors for a PLP dump operation during sudden power-off. The storage device 1000 may dump working data into the nonvolatile memory 1100 by using capacitors when sudden power-off occurs. The storage device 1000 may dump data based on a determined time (e.g., the calculated unit time).

The storage device 1000 may fail to move all the data due to various factors. At this time, even if user data is lost, the storage device 1000 may dump minimum essential recovery data (hereinafter, referred to as minimum recovery data) for recovery. The storage device 1000 may set a minimum time for dumping the minimum recovery data. The storage device 1000 waits for a minimum time (e.g., 15 milliseconds (ms)) and then does not treat it as a failure. The storage device 1000 may dump minimum recovery data before the minimum time.

The storage device 1000 may determine a capacitance value of a capacitor for dumping minimum recovery data into the nonvolatile memory 1100 in consideration of the surrounding environment and characteristics of the capacitor itself.

The capacitor capacity may vary depending on the surrounding environment and the characteristics of the capacitor itself. The storage device 1000 may perform a dump operation by setting a capacitor capacity capable of dumping the minimum recovery data to the nonvolatile memory 1100 rather than based on time. The storage device 1000 may monitor the remaining capacity of the capacitor and dump the minimum recovery data when the remaining capacity reaches a specific value.

Figure 5:
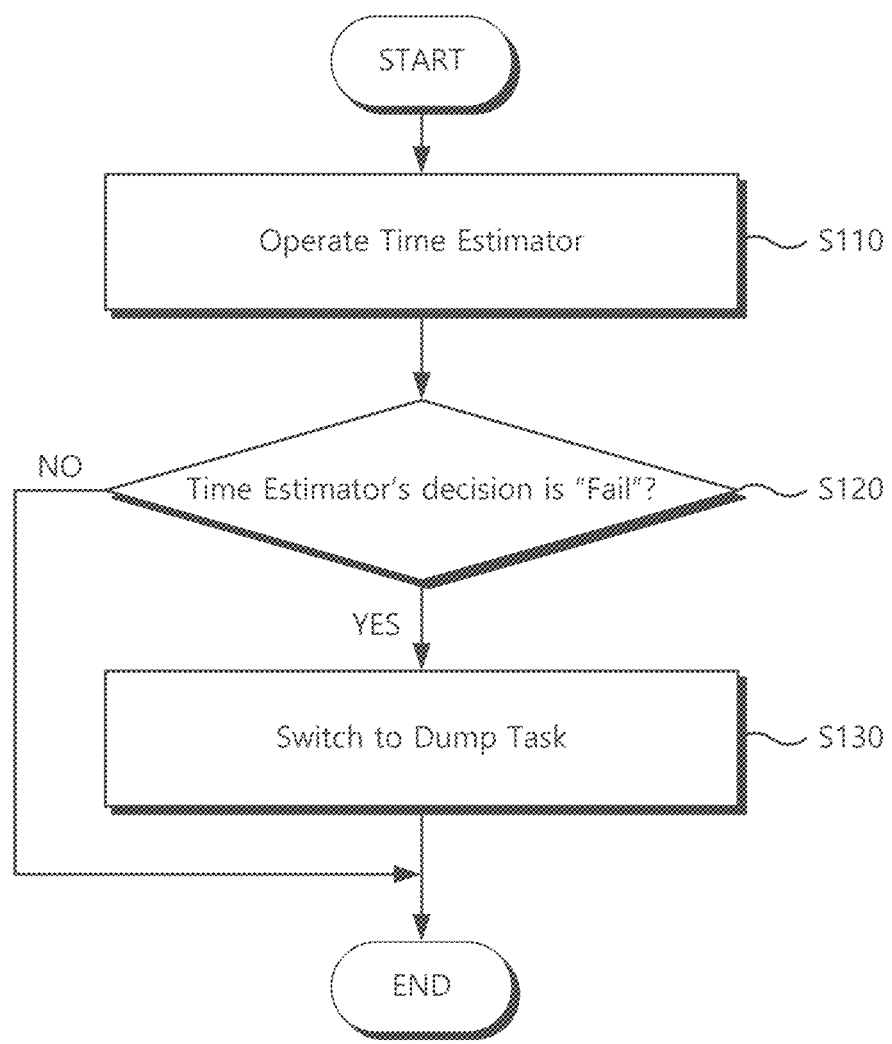
FIG. 5 is a flowchart illustrating an operating method of the time estimator illustrated in FIG. 4.

FIG. 5 is a flowchart illustrating an operating method of the time estimator illustrated in FIG. 4. FIG. 6 is a formula and diagram for explaining an operating method illustrated in FIG. 5.

Referring to FIG. 5, in step S110, the time estimator 1220 may perform a time prediction operation using the execution step manager 1221. The time estimator 1220 may perform a time prediction operation through an interrupt service routine (ISR). The time calculator 1223 may perform a time prediction operation by measuring Tmin, Test, Telapsed, and Tmisc.

Referring to FIG. 6, Tmin represents a minimum time required to guarantee a recovery data dump. Test represents an estimated time using a real-time capacitor discharge timer and its time-to-energy conversion logic. Telapsed represents the elapsed time after recognizing a power loss. Tmisc represents miscellaneous time including abort time and idle energy consumption.

Referring to FIGS. 5 and 6, in step S120, the time estimator 1220 may determine whether or not to fail. For example, the time estimator 1220 may determine whether Tmin is greater than or equal to Test-(Telapsed+Tmisc). If the determination of the time estimator 1220 is a fail (YES), step S130 may be performed. If the determination of the time estimator 1220 is not a fail (NO), the determination of the time estimator 1220 may be normally terminated.

In step S130, the time estimator 1220 may switch a task. For example, the time estimator 1220 may switch a task performed so far to a dump task. The dump task operation will be described in more detail in FIG. 9.

Figure 7:
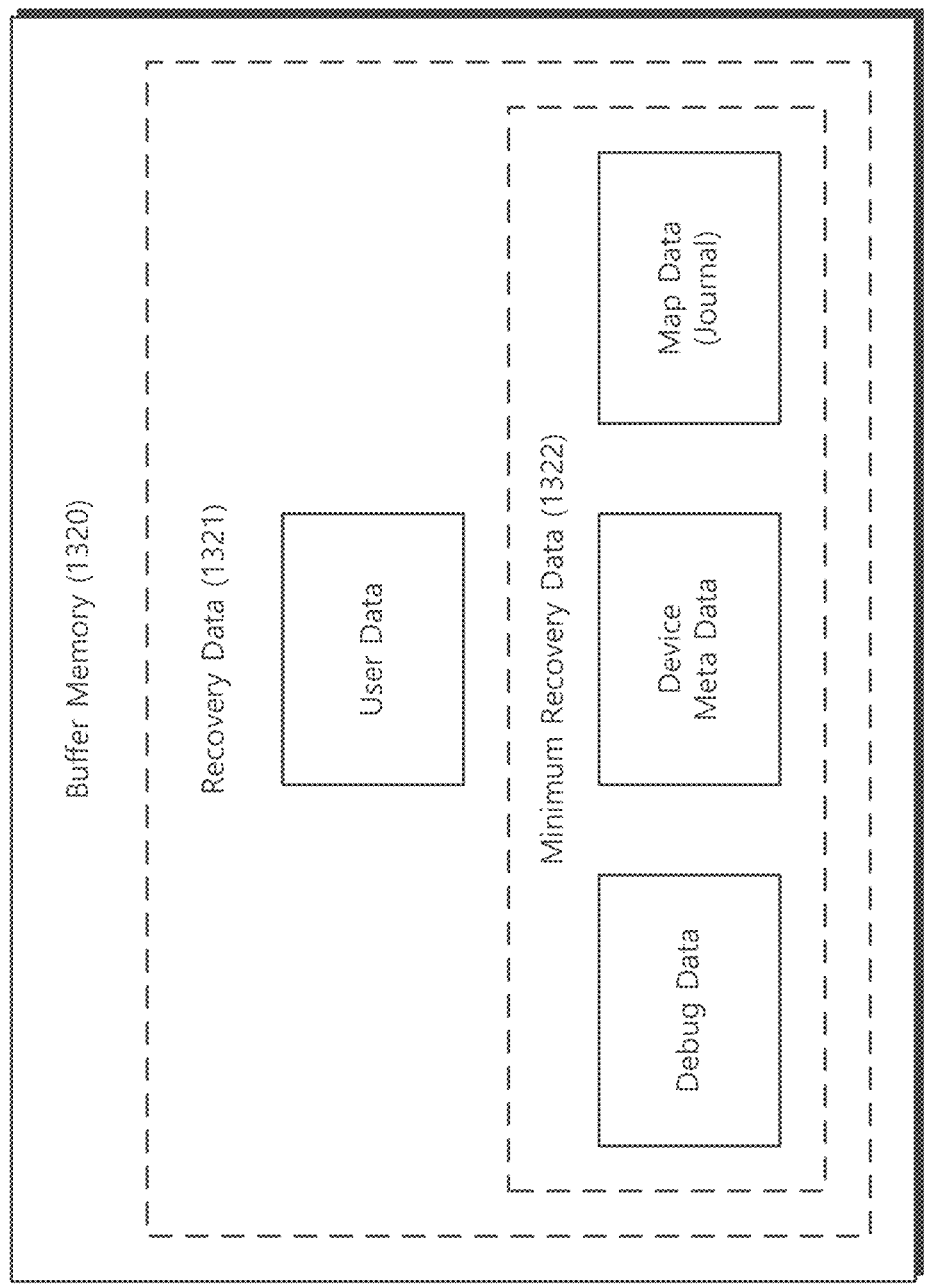
FIG. 7 is a diagram for illustrating recovery data stored in the buffer memory of FIG. 1.

FIG. 7 is a diagram for illustrating recovery data stored in the buffer memory of FIG. 1. Referring to FIGS. 1 and 7, recovery data may be stored in the buffer memory 1320. The recovery data may be data used to restore the storage device 1000 when power is restored after power is cut off. Accordingly, when power is cut off, the storage device 1000 is configured to move and store recovery data stored in the buffer memory 1320 to the flash memory 1100.

Recovery data may include user data, debug data, device metadata, and map data. Device metadata may be information about the storage device 1000. For example, it may include smart data, security data, metadata about characteristics of the nonvolatile memory 1100, and/or the like. The map data is map data for user data written in the nonvolatile memory 1100, and may be, e.g., L2P data.

Some of the recovery data may be minimum recovery data. The minimum recovery data may include data required to prevent the storage device 1000 from entering an unusable state, that is, a power failure state. Minimum recovery data may include, e.g., debug data, device metadata, map data, and the like. The storage device 1000 is configured to move the recovery data from the buffer memory 1320 to the flash memory 1100 when the power is cut off, but may preferentially move the minimum recovery data.

Figure 8:
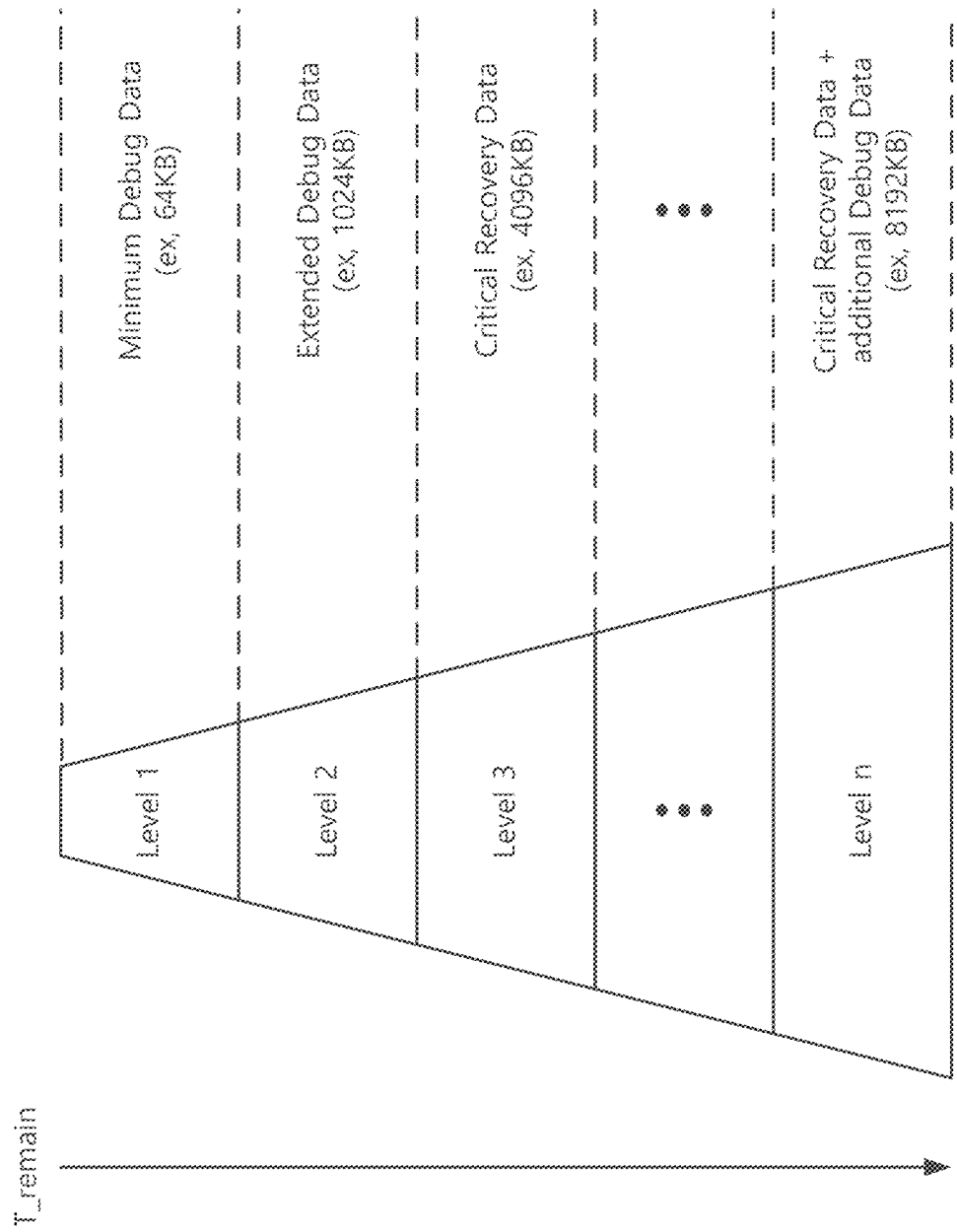
FIG. 8 is a diagram illustrating at least one example embodiment of the minimum recovery data illustrated in FIG. 7.

FIG. 8 is a diagram illustrating at least one example embodiment of the minimum recovery data illustrated in FIG. 7. The minimum recovery data may be predefined according to the remaining time or remaining energy after failure determination. The minimum recovery data may perform a dump operation according to a predefined dump level.

Referring to FIG. 8, the minimum recovery data may have first through n-th dump levels according to the remaining time T_remain. The first dump level (Level 1) may be performed when the remaining time is the smallest. When the remaining time corresponds to the first dump level, the PLP dump module 1230 may dump minimum debug data into the nonvolatile memory 1100. The minimum amount of dump data may be, for example, $2^x$ wherein x is an integer (e.g., $2^6$ or 64 KB).

The second dump level (Level 2) may be performed when the remaining time is greater than the first level. When the remaining time corresponds to the second dump level, the PLP dump module 1230 may dump extended debug data. The amount of dump data may be, for example, $2^{x+y}$, wherein y is an integer (e.g., $2^{10}$ or 1024 KB).

When the remaining time corresponds to the third dump level (Level 3), the PLP dump module 1230 may dump critical recovery data. The amount of dump data may be, for example, $2^{x+y'}$, wherein y' is an integer greater than y (e.g., $2^{12}$ or 4096 KB). In this way, the PLP dump module 1230 may define the minimum recovery data in detail according to the dump level.

When the remaining time corresponds to the n-th dump level (Level n), the PLP dump module 1230 may dump additional debug data together with critical recovery data. The amount of dump data may be, for example, $2^{x+y''}$, wherein y" is an integer greater y' (e.g., $2^{13}$ or 8192 KB).

The storage device 1000 may predefine a dump level according to the remaining time after failure determination and dump the minimum recovery data to the nonvolatile memory 1100 according to the dump level. The storage device 1000 may increase data resiliency and enhance debugging by performing a dump operation according to a dump level.

Figure 9:
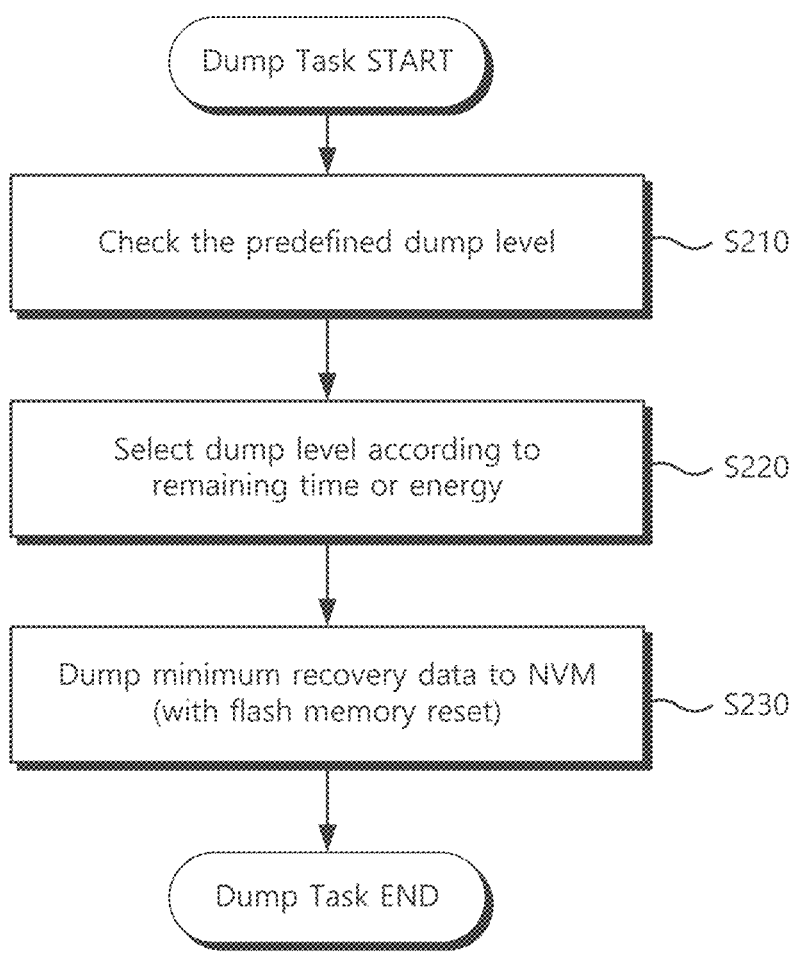
FIG. 9 is a flowchart illustrating a dump operation method of the storage controller illustrated in FIG. 4.

FIG. 9 is a flowchart illustrating a dump operation method of the storage controller illustrated in FIG. 4. The PLP dump module 1230 may dump the minimum recovery data to the nonvolatile memory 1100 according to a defined dump level after the time estimator 1220 determines failure.

Referring to FIGS. 1 and 8, in step S210, the PLP dump module 1230 may check a predefined dump level. As illustrated in FIG. 8, the dump level may be defined as n levels according to the remaining time. The dump level may be defined as a plurality of levels according to the amount of dump data or remaining energy in addition to the remaining time.

In step S220, the PLP dump module 1230 may select a dump level according to the remaining time and/or remaining energy. The remaining time may be provided from the power loss protection integrated circuit (PLP IC) 1400. The amount of remaining energy and/or dump data may be calculated in the time estimator 1220 based on the remaining time.

In step S230, the PLP dump module 1230 may dump the minimum recovery data to the nonvolatile memory 1100 according to the selected dump level. The PLP dump module 1230 may perform a flash memory reset operation to safely dump the minimum recovery data to the nonvolatile memory 1100. The flash memory reset operation may be an operation of resetting the flash memory to safely program the minimum recovery data in a situation in which the minimum recovery data may not be programmed.

The storage controller 1200 may receive remaining time information from the power loss protection integrated circuit 1400 and estimate the minimum remaining time and/or the amount of data for performing a dump operation. The storage controller 1200 may predefine a dump level and dump the minimum recovery data to the nonvolatile memory 1100 according to the dump level.

Figure 10:
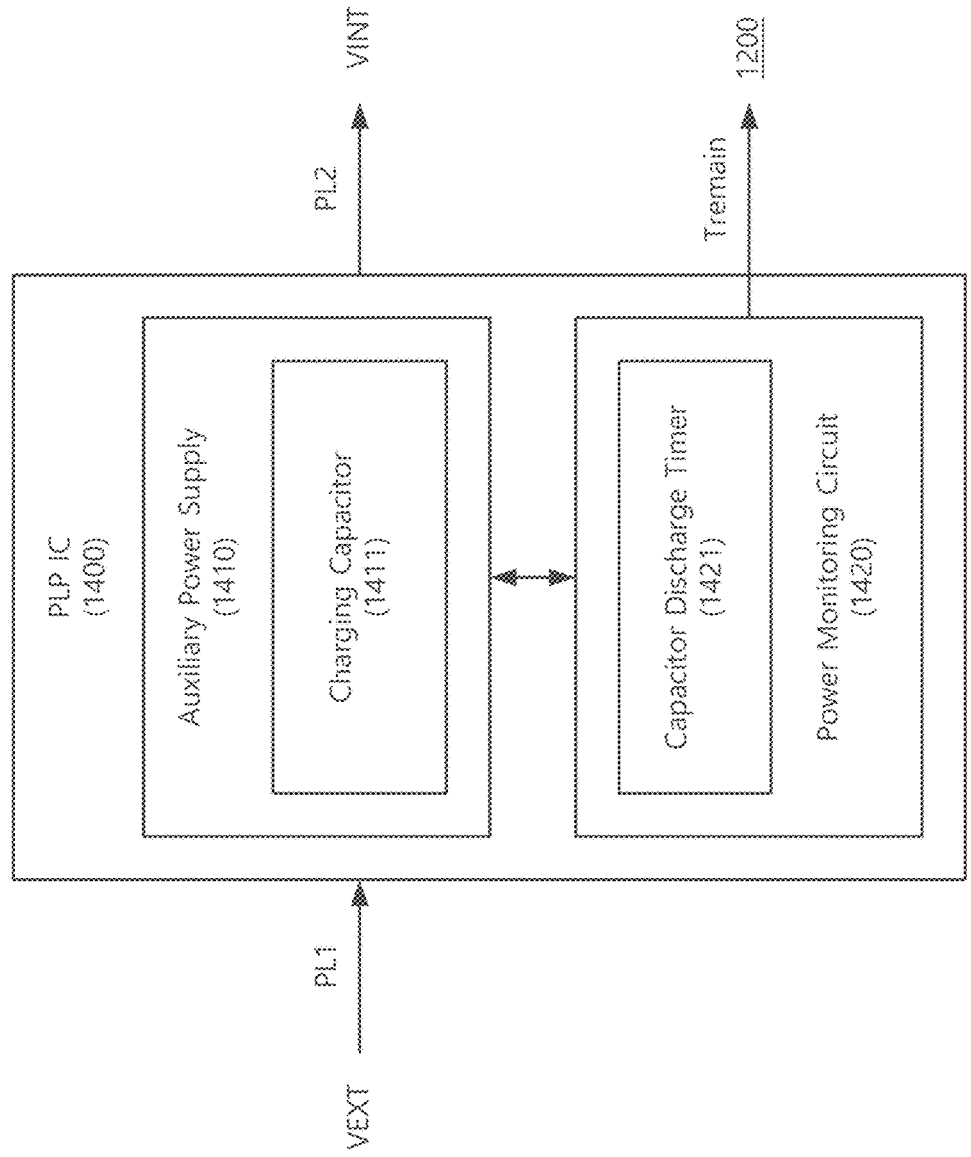
FIG. 10 is a block diagram illustrating at least one example embodiment of the power loss protection integrated circuit illustrated in FIG. 1.

FIG. 10 is a block diagram illustrating at least one example embodiment of the power loss protection integrated circuit illustrated in FIG. 1. Referring to FIG. 10, a power loss protection integrated circuit (PLP IC) 1400 may include an auxiliary power supply 1410 and a power monitoring circuit 1420.

The power loss protection IC 1400 may generate an internal power voltage VINT based on an external power voltage VEXT. The internal power supply voltage VINT may be provided to the power management integrated circuit 1500. When the storage device 1000 is suddenly powered off, the internal power voltage VINT may be used as an auxiliary power voltage.

The power loss protection integrated circuit 1400 may include an auxiliary power supply 1410 and a power monitoring circuit 1420. The auxiliary power supply 1410 may perform an operation of repeatedly charging electrical energy by the external power source VEXT supplied through the first power line PL1. The auxiliary power supply 1410 may supply auxiliary power to the second power line PL2 based on the charged electrical energy. The storage device 1000 including the storage controller 1200 may operate with power supplied to the second power line PL2.

The auxiliary power supply 1410 may include a charging capacitor 1411. The auxiliary power supply 1410 may store electrical energy in the charging capacitor 1411 using an external power source. The charging capacitor 1411 may include one or more capacitors. The charging capacitor 1411 may be classified as an electrolyte capacitor, a film capacitor, a tantalum capacitor, a ceramic capacitor, and/or the like based on dielectric materials.

The electrolyte capacitor may include a thin oxide film as a dielectric, and aluminum as electrodes, thereby being called an aluminum (Al) capacitor. The electrolyte capacitor has a good low frequency characteristic and may be embodied to have a high capacity of tens of thousands of microfarads (µF). The tantalum capacitor may have electrodes formed of tantalum (Ta) and may have excellent temperature and frequency characteristics compared to those of the electrolyte capacitor.

The film capacitor may have a structure in which a film dielectric such as polypropylene, polystyrol/polystyrene, polytetrafluoroethylene (e.g., Teflon), and/or the like is rolled up between electrodes formed of a conductor such as Al and/or copper (Cu). A capacity and use of the film capacitor may vary based on materials and manufacturing processes. A Mylar® capacitor including, e.g., BoPET (Biaxially-oriented polyethylene terephthalate), which may be a relatively inexpensive film capacitor, may be made by inserting a polyester film into metal and then winding the polyester film and the metal into a cylinder shape and may be mainly used in a high frequency circuit, an oscillation circuit, and/or the like.

The ceramic capacitor may include a high dielectric constant material such as titanium-barium as a dielectric. The ceramic capacitor has a good high frequency characteristic and may be configured to pass noise to ground. A multi-layer ceramic condenser (MLCC) that is a type of the ceramic capacitor may include a multilayered high dielectric constant ceramic structure as a dielectric between electrodes. Because the MLCC has excellent temperature and frequency characteristics and is small, the MLCC may be mainly used as a by-pass.

The auxiliary power supply 1410 may charge electrical energy while external power is normally supplied to the charging capacitor 1411. The auxiliary power supply 1410 may allow external power to be output to the second power line PL2 as main power. The auxiliary power supply 1410 may block the auxiliary power charged in the charging capacitor 1411 from being output to the second power line PL2.

When external power is not normally supplied (e.g., in the event of a sudden power-off), the auxiliary power supply 1410 may output the auxiliary power charged in the charging capacitor 1411 to the second power line PL2. A sudden power-off (SPO) situation may occur while the storage device 1000 is operating. In this sudden power-off situation, external power may not normally be supplied to the auxiliary power supply 1410 through the first power line PL1. The SPO situation may occur when the voltage level of the main power supply drops below an initially set minimum allowable operating voltage level.

The power monitoring circuit 1420 may monitor the charging capacitor 1411. For example, the power monitoring circuit 1420 may monitor the voltage of the charging capacitor 1411. In some example embodiments, the power monitoring circuit 1420 may monitor a capacitance change of the charging capacitor 1411 by measuring a voltage of the charging capacitor 1411.

The power monitoring circuit 1420 may adjust the charging voltage VC of the charging capacitor 1411 according to the capacitance change of the charging capacitor 1411. The power monitoring circuit 1420 may control the level of the charging voltage VC of the charging capacitor 1411 to increase as the capacitance of the charging capacitor 1411 decreases. For example, the power monitoring circuit 1420 may primarily charge the charging capacitor 1411 with the first charging voltage VC1. The power monitoring circuit 1420 may charge the charging capacitor 1411 with the second charging voltage VC2 when the capacitance of the charging capacitor 1411 is reduced. At this time, the level of the second charging voltage VC2 may be higher than the level of the first charging voltage VC1.

The power monitoring circuit 1420 may include a capacitor discharge timer 1421. The capacitor discharge timer 1421 may store charging voltage information of the charging capacitor 1411. The capacitor discharge timer 1421 may calculate a discharge time of the charging capacitor 1411 based on the charging voltage information. The power monitoring circuit 1420 may calculate the remaining time Tremain based on the discharging time. The power monitoring circuit 1420 may provide remaining time information to the storage controller 1200.

According to the present disclosure, it may be possible to reduce a test time taken to perform the margin read test operation and to perform the margin read test operation in high speed.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
    a non-volatile memory configured to store data;
    a storage controller configured to determine a time to back up recovery data when a sudden power-off occurs and to perform a data dump operation according to a dump level determined based on the determined time in response to a user data dump failure during the sudden power-off; and
    a power loss protection (PLP) integrated circuit configured to measure at least one of a discharge time or remaining time of an auxiliary power supply when the sudden power-off occurs and to provide at least one of discharge time information or remaining time information to the storage controller,
    wherein the storage controller is configured to determine a minimum recovery data backup time in case of the user data dump failure using the at least one of the discharge time information or the remaining time information,
    wherein the user data dump failure includes a condition wherein data will be lost due to the determined time being greater than the discharge time or the remaining time, and
    wherein the data dump operation includes performing the data dump operation such that minimum essential recovery data is not included in the lost data.

2. The storage device of claim 1, wherein the storage controller comprises
    a time estimator including processing circuitry configured to determine the time to back up the recovery data when the sudden power-off occurs; and
    a PLP dump module including processing circuitry configured to perform the data dump operation to back up the recovery data according to the determined dump level.

3. The storage device of claim 2, wherein the time estimator comprises an execution step manager configured to manage the time to perform at least one remaining operation after the user data dump failure and to determine which execution step is to be performed.

4. The storage device of claim 3, wherein the time estimator is configured to determine the time to back up the minimum recovery data using at least one of a time or energy database and to determine a remaining time information.

5. The storage device of claim 3, wherein the time estimator is configured to determine a unit time based on at least one of a minimum guaranteed operation time to back up at least one of the minimum recovery data or a reference dump amount.

6. The storage device of claim 3, wherein the time estimator is configured to determine a dump guarantee time, according to at least one of lifetime or environment, by checking the remaining time information in real time.

7. The storage device of claim 2, wherein the time estimator is configured to perform a time estimation operation by measuring at least one of a minimum time (Tmin) to guarantee a recovery data dump, an estimated time (Test) using a real-time capacitor discharge timer and time-to-energy conversion logic of the real-time capacitor discharge timer, an elapsed time (Telapsed) after recognizing a power loss, or a miscellaneous time (Tmisc) including abort time and idle energy consumption.

8. The storage device of claim 7, wherein the time estimator is configured to switch to a dump task based on a determination that the Tmin is greater than or equal to Test−(Telapsed+Tmisc).

9. The storage device of claim 2, wherein
the PLP dump module is configured to perform a dump operation, the dump operation including moving data stored in a buffer memory to the non-volatile memory, and
the data dumped by the PLP dump module includes the minimum recovery data.

10. The storage device of claim 9, wherein the minimum recovery data is determined as a plurality of dump levels according to the remaining time information, and
wherein a dump level, of the plurality of dump levels, having a smallest remaining time comprises a minimum debug data.

11. A method for backing up recovery data of a storage device comprising:
determining at least one of a discharge time or a remaining time of an auxiliary power supply when a sudden power-off occurs;
determining a minimum recovery data backup time, in case of a user data dump failure, using the determined at least one of the discharge time or the remaining time; and
performing, in the case of the user data dump failure, a data dump operation according to a defined dump level during the determined recovery data backup time,
wherein the user data dump failure includes a condition wherein data will be lost due to a time to back up recovery data being greater than the discharge time or the remaining time, and
wherein performing the data dump operation includes performing the data dump operation such that minimum essential recovery data is not included in the lost data.

12. The method of claim 11, wherein the determining the minimum recovery data backup time includes determining a time for backing up the recovery data in each of a plurality of dump levels based on an amount of data in the defined dump level.

13. The method of claim 11, further comprising:
performing a time estimation operation by measuring at least one of a minimum time (Tmin) to guarantee a recovery data dump, an estimated time (Test) using a real-time capacitor discharge timer and time-to-energy conversion logic time-to-energy conversion logic of the real-time capacitor discharge timer, an elapsed time (Telapsed) after recognizing a power loss, or a miscellaneous time (Tmisc) including abort time and idle energy consumption.

14. The method of claim 13, wherein the performing the data dump operation is initiated based on a result of a comparison of the Tmin and of Test−(Telapsed+Tmisc).

15. The method of claim 11, wherein the data dump operation includes moving data stored in a buffer memory to a non-volatile memory.

16. The method of claim 15, wherein
the minimum recovery data dumped into the non-volatile memory is determined as a plurality of dump levels according to the remaining time, and
a dump level, of the plurality of dump levels, having a smallest remaining time comprises a minimum debug data.

17. A storage system comprising:
a storage device including non-volatile memory and processing circuitry; and
a host connected to the storage device through a host interface,
wherein the storage device is configured to
determine at least one of a discharge time or a remaining time of an auxiliary power supply when sudden power-off occurs,
determine a minimum recovery data backup time, in case of a user data dump failure, using the determined at least one of the discharge time or the remaining time, and
perform, in the case of the user data dump failure, a data dump operation according to a defined dump level during the determined recovery data backup time,
wherein the user data dump failure includes a condition wherein data will be lost due to a time to back up recovery data being greater than the discharge time or the remaining time, and
wherein performing the data dump operation includes performing the data dump operation such that minimum essential recovery data is not included in the lost data.

18. The storage system of claim 17, wherein the storage device is configured to determine a time to back up the minimum recovery data in each of a plurality of dump levels based on an amount of data in the defined dump level.

19. The storage system of claim 17, wherein
the minimum recovery data dumped into the non-volatile memory is determined as a plurality of dump levels according to remaining time, and
a dump level, of the plurality of dump levels, having a smallest remaining time comprises a minimum debug data.

20. The storage system of claim 17, wherein the storage device is a solid-state drive (SSD).

* * * * *